April 18, 1950 G. T. SCHMIDLING 2,504,734

COMBINED TELEVISION VIEWING AND RECORDING APPARATUS

Filed April 9, 1946 3 Sheets-Sheet 1

INVENTOR.
GILBERT T. SCHMIDLING.
BY Edwin Leisohn
ATTORNEY

April 18, 1950 G. T. SCHMIDLING 2,504,734

COMBINED TELEVISION VIEWING AND RECORDING APPARATUS

Filed April 9, 1946

3 Sheets-Sheet 2

INVENTOR.

GILBERT T. SCHMIDLING

BY Edwin Leisohn

ATTORNEY

April 18, 1950 G. T. SCHMIDLING 2,504,734

COMBINED TELEVISION VIEWING AND RECORDING APPARATUS

Filed April 9, 1946 3 Sheets-Sheet 3

INVENTOR.
GILBERT T. SCHMIDLING
BY Edwin Leisohn
ATTORNEY

Patented Apr. 18, 1950

2,504,734

UNITED STATES PATENT OFFICE 2,504,734

COMBINED TELEVISION VIEWING AND RECORDING APPARATUS

Gilbert T. Schmidling, New York, N. Y., assignor to International Mutoscope Corporation, Long Island City, N. Y., a corporation Application April 9, 1946, Serial No. 660,616

23 Claims. (Cl. 178—6.7)

This invention relates to photography of television images.

The primary object of the present invention is to provide means for obtaining photographs of images appearing on the screen of a television receiver without obstructing or in any other manner interfering with the view of the images on the screen.

Another object of the invention is the provision of means for obtaining photographs of televised images produced on the fluorescent screen of the cathode ray television receiver tube, said means being automatically operable in response to the operation of a push button or other simple device which may be operated as desired, at any time during the operation of the television receiver for obtaining photographs of selected single-frame television images.

A further object of the invention is the provision of television-image photographing means which comprises a shutter which is of such construction and which operates in such manner as to enable a single-frame television image to be photographed without blurring of the photograph.

A further object of the invention is to provide a combination television receiver and photographic apparatus so arranged that any number of consecutive or discrete single-frame photographs can be obtained.

The above and other objects, features and advantages of the present invention will be fully understood from the following description considered in connection with the accompanying illustrative drawings.

Figure 1:
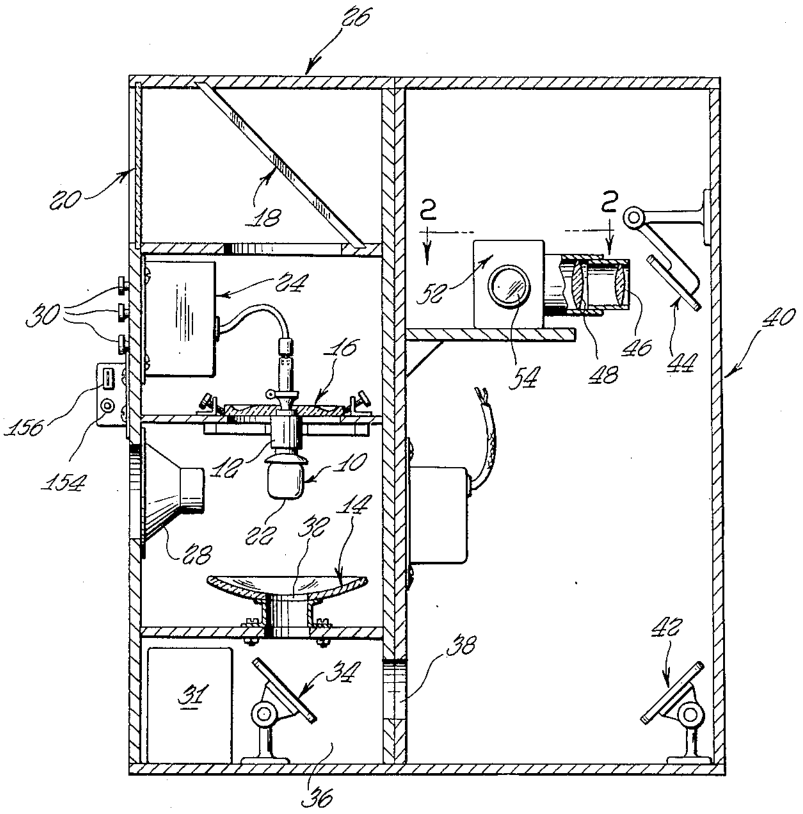
Fig. 1 is a view partly in elevation and partly in section of a combination television receiver and photographic apparatus embodying the present invention, the view of the photographic apparatus being taken on the line 1—1 of Fig. 2.

Referring now to the drawings in detail, the apparatus embodying the present invention is illustrated more or less diagrammatically in association with a television receiver of the projection type, preferably of the reflective optical type operating on the principle known as "Schmidt Optics." As here shown, said receiver comprises a cathode ray television tube 10 provided with the usual scanning coils indicated at 12, a spherical reflector 14, a correcting lens 16, a plane mirror or other reflector 18 and a viewing screen 20. It will be understood that the images which appear on the fluorescent screen 22 of the tube 10 are reflected by the spherical mirror 14 through the corrective lens 16 to the reflector 18 and by the latter onto the viewing screen 20. The television receiver chassis is indicated at 24 mounted in any suitable way, as usual, within the cabinet 26 of the television receiver. The usual loud speaker is indicated at 28 and the tuning controls are indicated at 30. The high and low voltage supply devices may be disposed in the cabinet as indicated at 31.

Figure 2:
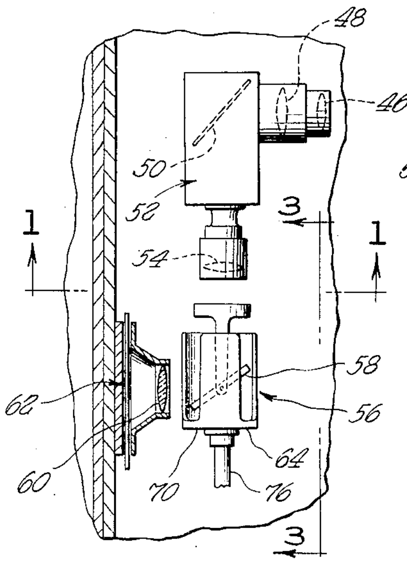
Fig. 2 is a top plan view partly in section on the line 2—2 of Fig. 1.
Figure 3:
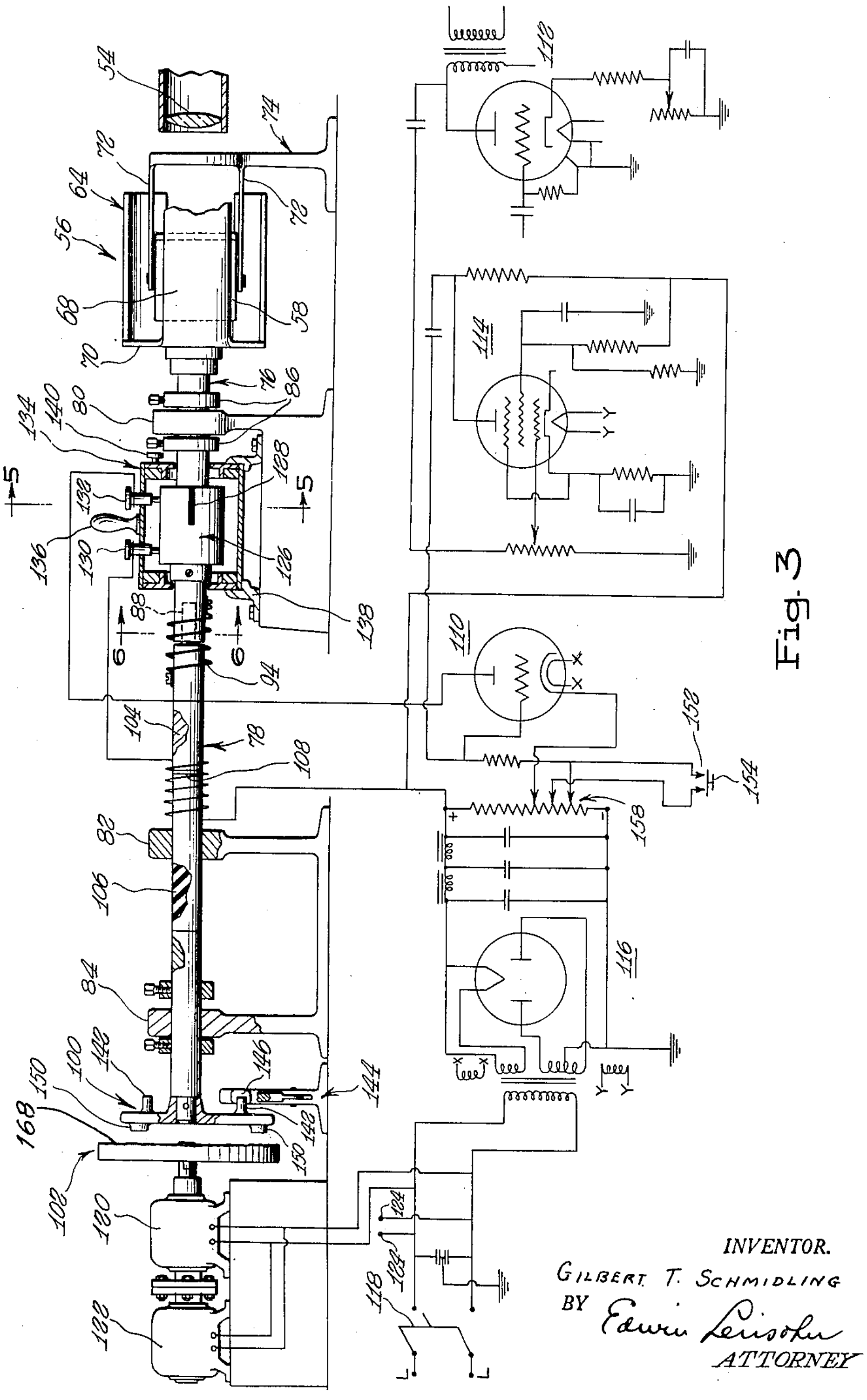
Fig. 3 is a side view of the apparatus, with parts in section, viewed as indicated by the line 3—3 of Fig. 2, and showing also the circuit diagram.
Figure 4:
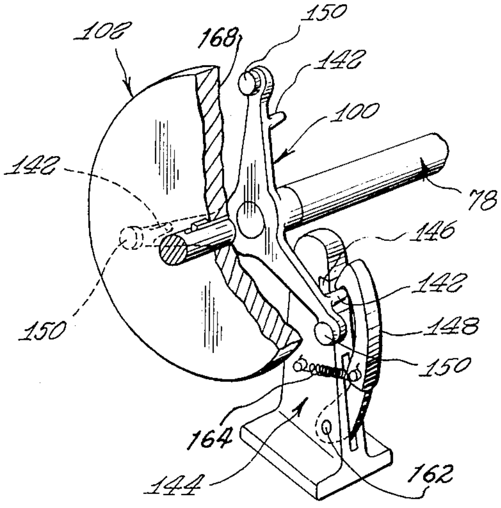
Fig. 4 is a perspective view of part of the shutter operating means, with a portion cut away for the purpose of illustration.
Figure 8:
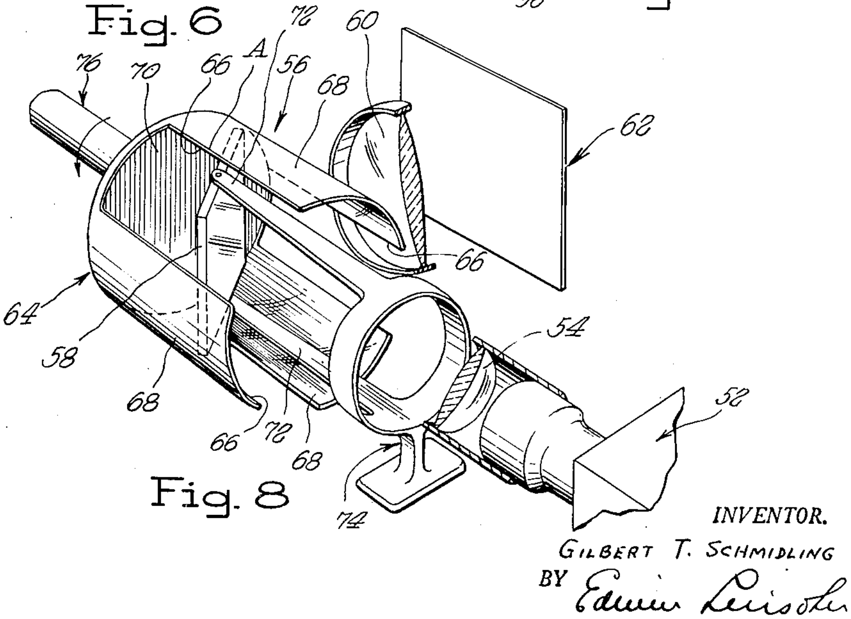
Fig. 8 is a perspective view of the shutter.

The spherical reflector 14 is provided with a central opening 32 which is in axial registry with the television tube for the passage of images from the fluorescent screen 22 to a reflector 34 positioned in chamber 36 of cabinet 26. An opening 38 is provided between the cabinet 26 and the cabinet 40 of the photographic apparatus for reflection of the images by reflector 34 to a reflector 42 and by the latter to a reflector 44 which reflects the images through one or more lenses here shown as lenses 46 and 48 to a plane mirror or other plane reflector 50. Said lenses and reflector are mounted in a housing 52 which is also provided with a lens 54 through which the images are transmitted to the shutter device 56 (Figs. 2, 3 and 8). The shutter device includes a reflector 58 which directs the images through a lens 60 onto the sensitized plate 62 for taking a photograph of a single-frame interlaced television image as will hereinafter more fully appear. The sensitized or photographic plates can be of any suitable type but are preferably of the direct positive type as shown in the United States Patent to Rabkin et al. No. 2,192,755, and in this connection, it will be understood that the mechanisms and means shown in said patent can be utilized for moving the sensitized plates individually from a supply magazine to a position for exposure when a photograph of the televised image is to be taken, and for transferring the exposed plate to a development and re-exposing chamber in which the exposed plates are developed, further exposed and further treated and thereafter dispensed, all as described in said patent. It will be understood, however, that photographs may be made on any suitable sensitized photographic plate and that the term plate includes films as well as other sensitized material whether in the form of a strip for one or more pictures or in the form of a web for a plurality of pictures. The image may also be received on a fluorescent or phosphorescent screen, for testing scanning lines, or may be received on a photo-electric surface for other purposes, such as relaying of images or signals for correcting networks or other operations or on a scanned photo-electric surface, such as for example a television camera.

Referring now more particularly to the shutter device 56, the latter comprises a rotary drum 64 having as here shown three openings 66 of the same size and disposed in equi-spaced relation circumferentially of the drum. The peripheral drum portions 68 between said openings may, for convenience in reference, be referred to as vanes. The shutter drum 64 has an imperforate wall 70 at one end thereof and is open at its opposite end to receive the arms 72 of the supporting means for the plane reflector 58. Said reflector-supporting arms are carried by a stationary support 74. It will be understood that the shutter drum 64 rotates around the stationary reflector 58 and that images can pass from said reflector to the photographic plate 62 only through an opening 66 of the shutter.

The shutter drum or scanning shutter 64 is carried and rotated by a rotary shaft section 76 which is connected to a rotary shaft section 78 in such manner as to permit longitudinal movement of said last mentioned shaft section without relative rotary movement between said two shaft sections. The shaft constituted by sections 76 and 78 is journalled for rotation in bearings 80, 82 and 84, collars 86 being provided adjacent bearing 80 to prevent longitudinal movement of shaft section 76 in either direction. In order to permit relative longitudinal movement of said shaft sections, shaft section 78 is provided with a non-circular axial projection 88 which is slidable in an axial recess 90 in shaft section 76, roller bearings 92 being provided to reduce friction between said two sections during the relative longitudinal movement thereof. A spring 94 is connected at its opposite ends 96 and 98 to shaft section 76 and 78, respectively, for releasably holding shaft section 78 in its retracted position in which the driven clutch member 100 which is fixed to shaft section 78 is out of engagement with the driving clutch member 102.

A solenoid coil 108 is disposed around shaft section 78 and when energized is effective to move shaft section 78 longitudinally to the left, viewing Fig. 3, whereby to engage the clutch member 100 with the driving clutch member 102, and it will be understood that when said solenoid is de-energized spring 94 is effective to move shaft section 78 in the opposite direction whereby to disengage the driven clutch member 102. Shaft section 78 has a magnetic part 104 and an adjacent non-magnetic part 106 which, for that purpose, may be formed of any suitable non-magnetic material, for example, brass or insulation material. In the non-energized condition of the solenoid coil the adjacent ends of said magnetic and non-magnetic sections are located as indicated at 108 so that the magnetic section 104 which constitutes the core of the solenoid is in a position to be drawn into the solenoid coil when the latter is energized whereby to engage the clutch members to effect rotation of the shutter drum which is carried by the shaft section 76.

The solenoid coil 108 is connected in the plate circuit of a thyratron 110 which is operable under the control of the output 112 of the vertical oscillator of the television receiver through a voltage amplifier 114. Current for the thyratron is supplied by the rectifier 116 which is supplied with 60 cycle alternating current from the lines L through a switch 118. A synchronous motor 120 which operates at a speed of 600 R. P. M. is also connected to said source of alternating current, as illustrated, and is brought up to speed by an asynchronous motor 122 which is connected to said synchronous motor for that purpose. The terminals for the television receiver are indicated at 124. It will be understood that when switch 118 is closed for operating the television receiver, synchronous motor 120, brought up to speed by motor 122, is likewise operated and continues to operate, unless intentionally disconnected, whereby driving clutch member 102 is similarly continuously rotated during the operation of the television receiver. Asynchronous motor 122 is cut off by centrifugal switch, if desired, when motor 120 arrives at speed of 600 R. P. M.

When the solenoid 108 is energized pursuant to the operation of the thyratron 110, so as to move the member 100 into engagement with the continuously rotating driving clutch member 102, the drum carrying shaft is rotated but only through one-third of one revolution, by reason of the provision of means for de-energizing the solenoid coil as soon as the shutter drum has made one-third of a turn. The means provided for this purpose comprises a commutator 126 which is fixed to and is carried by shaft section 76. Said commutator is formed of a sleeve of conducting material and is provided with three insulation portions or segments 128 disposed in equi-spaced circumferential relation. Brushes 130 and 132 are mounted for engagement with commutator 126, brush 130 being in engagement with the peripherally continuous conducting part of said commutator while brush 132 is disposed for engagement at the part of said commutator which is provided with the insulation segments 128. Said brushes are carried by an adjustable frame 134 which is mounted for rotary adjustment around commutator 126, said frame being provided with a handle 136 fixed thereto for adjusting said frame and the brushes carried thereby in relation to said commutator circumferentially thereof. Said frame 134 is mounted for turning movement in a suitable support 138, and a set screw 140 is provided for releasably securing said brush carrying frame in adjusted position.

Figure 5:
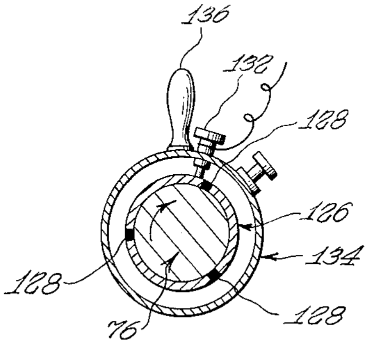
Fig. 5 is a sectional view on the line 5—5 of Fig. 3.
Figure 6:
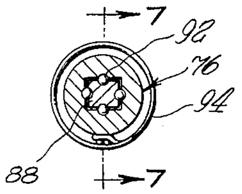
Fig. 6 is a sectional view on the line 6—6 of Fig. 3.
Figure 7:
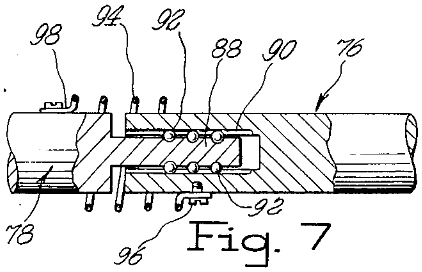
Fig. 7 is a sectional view on the line 7—7 of Fig. 6.

Thus, assuming that the solenoid coil 108 has been energized for moving the clutch member 100 into engagement with the companion clutch member 102, the shaft 76 being rotated in the direction of the arrow in Figs. 5 and 8, that is in a clockwise direction, viewing Fig. 5, said shaft and the shutter carried thereby will make only one-third of a turn since the brush 132 will engage the insulation segment 128 of the commutator and as a result the circuit through the solenoid coil will be interrupted with the result that the spring 94 will immediately move the shaft section 78 toward the right, viewing Fig. 3, whereby to disengage the clutch member 100 from said companion clutch member 102. Suitable means are provided to hold the movable clutch member and the drum carrying shaft releasably against rotation in the retracted position of said shaft. For this purpose the clutch member 100 is provided with pin projections 142 which are disposed in equally spaced relation circumferentially of said clutch member. A stop member 144 having a rubber or other resilient insert 146 is disposed in the path of the pin projections 142 when the clutch member is in its retracted position, and a spring pressed pawl 148 is arranged to releasably engage the projection 142 which engages the stop member 144 at the insert 146 thereof to prevent rebound of the clutch member 100 and to hold the latter releasably in stationary position. Any suitable clutch members may be provided for driving the shaft and the shutter carried thereby. However, as here shown, the driving clutch member 102 is in the form of a circular disk provided with a friction surface 168 and the driven clutch member 100 is provided with a plurality of friction members 150 which are engageable with said friction surface 168. The pivot for the retaining pawl is indicated at 162 and the spring for holding said pawl in releasable engagement with the projection 142 is indicated at 164.

In operation, the thyratron 110 has sufficient negative grid bias to prevent the flow of current in its plate circuit. However, the plate circuit can be energized at any time by making the grid bias less negative, and this is accomplished by decreasing the resistance of the cathode bias resistor. More specifically as illustrated in Fig. 3, a switch 152, preferably a switch operated by a push button 154 is utilized for cutting out a part of the cathode-bias resistor. The positive pulse from the voltage amplifier 114 assisted by the additional positive voltage obtained when the switch 152 is closed by the push button 154 are effective to operate the thyratron for energizing the solenoid coil 108. It will be understood that the positive pulse from the voltage amplifier alone is just slightly less than sufficient to actuate the thyratron plate circuit and that the slight additional positive voltage required to effect the operation of the thyratron, so that current flows in its plate circuit, is obtained when switch 152 is closed by operation of the push button. It will be noted that the push button 154 for operating said switch is mounted in a convenient position at the front of the cabinet 26 of the television receiver as illustrated in Fig. 1. Also as here shown the apparatus may be provided with a coin slot 156 for a coin controlled mechanism (not shown) of any suitable type which may be arranged for preventing operation of the push button 154 to close switch 152 unless a coin is inserted in the slot of the coin controlled mechanism. Further, it will be understood that when the apparatus is provided in conjunction with photographic plate supplying, developing and dispending means, for example, as disclosed in the above mentioned Patent No. 2,192,755, the coin controlled mechanism may be arranged to control the operation of the photographic machine.

In order to operate the machine for obtaining a picture at the instant it is observed on the screen 20 of the television receiver, it is merely necessary to operate the push button 154, after having inserted a coin in the coin slot 156 if the apparatus is provided with a coin controlled mechanism. It will be noted that the synchronizing signal for the operation of the camera shutter 64 is taken from the output of the vertical oscillator 112 of the television receiver. This does not interfere with the image on the screen 20 or with the sync. A portion of the vertical output is amplified by the voltage amplifier 114, and when the button 154 is operated for closing the switch 152, a less negative impulse is impressed upon the thyratron but the latter waits for the signal since as explained above the operation of the thyratron whereby current flows in its plate circuit for energizing the solenoid coil 108 requires both signal pulse and the decrease in the resistor bias of the cathode circuit of the thyratron. At the signal, the solenoid coil is energized as explained above for effecting the rotation of the shutter which as previously explained rotates one-third of a turn because the thyratron circuit is interrupted by the commutator 126. When the plate circuit of the thyratron is opened, current will not flow until the previously described grid condition of the thyratron is re-established by the next operation of switch 152 by button 154.

Figure 9:
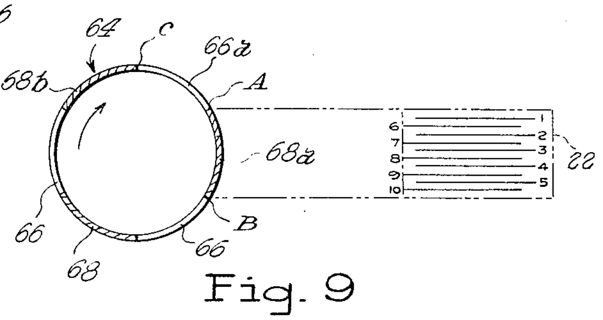
Fig. 9 is a view, partly diagrammatic, illustrating the image-scanning operation of the shutter in making an exposure.

Considering now the scanning operation of the shutter, reference being had to Fig. 9 which illustrates more or less diagrammatically the optical relation of the shutter to the screen 22 of the television tube, it will be noted that by causing the shutter drum to make one-third of a turn, one frame consisting of two interlaced fields will be exposed by the shutter for taking the picture. This exposure takes place as follows: The drum, rotating in the direction of the arrow, movement of the drum from A to B (B being a stationary point) requires $^1/_{60}$ of a second and movement from C to B requires another $^1/_{60}$ of a second, or a total of $^1/_{30}$ of a second for one-third revolution of the drum. One revolution requires 3 times as long or $^1/_{10}$ of a second, 10 revolutions per second times 60 equalling 600 R. P. M. which is the speed of rotation of the drum carrying shaft as determined by the synchronous speed of motor 120. The television image consists of two fields of interlaced scanning lines. The picture is scanned as follows: Lines 1, 3, 5, etc. to the bottom of the picture after which the next field starts with lines 2, 4, 6, etc. to the bottom of the picture. The normal position of the shutter in reference to the television image is shown in Fig. 9, said image being cut off from the photographic plate 62 by the vane 68*a*. As the shutter drum 64 rotates clockwise, the opening 66*a* travels progressively in registry with the scanning lines as they travel from the top to the bottom of the picture. Therefore, the opening 66*a* precedes the first field, and this operation requires $^1/_{60}$ of a second. By the time the scanning lines have reached the bottom of the image the point of the drum indicated at A is at the position at which the point B was previously located in relation to the image and the scanning lines start over again at the top in the second series, and correspondingly the shutter begins to close as the vane 68*b* travels so that one field, composed of two frames, has been exposed when the point of the drum indicated at C reaches the point at which the point B of the drum was located at the start of the operation for exposing the plate 62 to a single-frame image on the screen 22 of the television tube 10. It will be understood a source of a 60 cycle voltage having the proper wave form required to give the saw-tooth currents for the scanning coils will be provided. The control range of the thyratron to operate on any part of the previous cycle is made available by the potentiometer indicated at 158 (Fig. 3) in the cathode circuit of the thyratron as required to overcome mechanical variations or inertia in starting and stopping.

It will be noted that the scanning shutter 64 enables television images to be photographed without blurring of the image. Further, it will be observed that the operation of the shutter under the control of the synchronizing signal taken from the vertical oscillator of the television receiver prevents blurring which might otherwise occur. Blurring of the image is impossible even if movement of the image across the screen 22 is faster than $^1/_{30}$ of a second, since the rate of decay of the fluorescent material is such that the image is retained for the duration of one field. On the other hand, if the synchronizing signal were taken from the synchronizing signal transmitted from the broadcast station the apparatus would operate whether or not an image was on the screen. In other words, by utilizing the synchronizing signal from the oscillator output, the picture and output are synchronized together with the operation of the camera shutter.

It will be understood that various changes in the details of construction and in the arrangement of parts may be made without departing from the underlying idea or principles of this invention within the scope of the appended claims.

Having thus described my invention, what I claim and desire to secure by Letters Patent, is:

1. In apparatus for photographing a televised image appearing on the screen of a cathode ray tube of a television receiving apparatus having a viewing screen on which the televised image appearing on the screen of said tube is projected, the combination with said television receiver of means for exposing a sensitized photographic surface to the televised image appearing on the screen of said tube while said image is appearing on said viewing screen of the television receiving apparatus, said means comprising a shutter positioned out of the path of projection of the image from said screen of the tube to said viewing screen and means positioned out of the path of projection of the image from the screen of the tube to said viewing screen for optically transmitting said image to said shutter whereby to photograph said image without obstructing the view of the image on the viewing screen, and means operable under the control of the synchronizing signal means of the receiver for actuating said shutter to expose said sensitized surface.

2. In apparatus for photographing a televised image appearing on the screen of a cathode ray tube of a television receiving apparatus having a viewing screen on which the televised image appearing on the screen of said tube is projected, the combination with said television receiver of means for exposing a sensitized photographic surface to the televised image appearing on the screen of said tube while said image is appearing on said viewing screen of the television receiving apparatus, said means comprising a rotary scanning shutter positioned out of the path of projection of the image from said screen of the tube to said viewing screen, said scanning shutter comprising a rotary drum having a plurality of circumferentially spaced openings, and a reflector mounted in stationary position within said drum for receiving the image from the screen of said tube and for reflecting said image through one of said openings at the time of exposure.

3. Apparatus for photographing a single-frame interlaced televised image appearing on the screen of a cathode ray tube, comprising a movable photographic shutter, said shutter having a series of spaced openings and closed portions between pairs of adjacent openings, respectively, of said series, and means for moving said shutter in timed relation to the image forming lines of said frame on said screen for exposing the same area of a photograph plate through one of said openings first to the scanning lines of the first field of said single-frame televised image and thereafter through another of said openings to the scanning lines of the second field of said single-frame televised image with interruption, by said closed portion of the shutter while the shutter continues to move, of the exposure of said area between the exposures thereof to said two fields, and means for interrupting the movement of said shutter as soon as another of said series of openings is positioned for the next exposure.

4. Apparatus for photographing a televised image appearing on the screen of a cathode ray tube of a television receiver which is provided with a vertical oscillator, comprising a movable photographic shutter, means for operating said shutter, a source of direct-current voltage, means operable under the joint control of said voltage and the output pulse of said vertical oscillator of the television receiver for controlling the actuation of said shutter-operating means, and switching means for placing said actuation control means under said joint control of said direct-current voltage and said output pulse of said vertical oscillator.

5. Apparatus for photographing a single-frame interlaced televised image appearing on the screen of a cathode ray tube, comprising a movable shutter, said shutter having a series of spaced openings and closed portions between pairs of adjacent openings, respectively, of said series, and means for moving said shutter in timed relation to the image forming lines of said frame on said screen for exposing the same area of a photograph plate through one of said openings first to the scanning lines of the first field of said single-frame televised image and thereafter through another of said openings to the scanning lines of the second field of said single-frame televised image with interuption, by said closed portion of the shutter while the shutter continues to move, of the exposure of said area between the exposures thereof to said two fields, and means for interrupting the movement of said shutter as soon as another of said series of openings is positioned for the next exposure, said shutter comprising a drum provided with said openings spaced circumferentially of the drum and with another opening of one end of the drum and image-reflecting means positioned within said drum and disposed in image-receiving relation to said tube through said end opening in position to reflect said image through the shutter openings.

6. Apparatus for photographing a televised image appearing on the screen of a cathode ray tube, comprising a movable shutter, said shutter having a series of spaced openings and closed portions between pairs of adjacent openings, respectively, of said series, and means for moving said shutter in timed relation to the image forming lines of said frame on said screen for exposing the same area of a photograph plate through one of said openings first to the scanning lines of the first field of said single-frame televised image and thereafter through another of said openings to the scanning lines of the second field of said single-frame televised image with interruption, by said closed portion of the shutter while the shutter continues to move, of the exposure of said area between the exposures thereof to said two fields, means for rotating said shutter, and means operable to interrupt the rotation of said shutter after a predetermined part of one revolution thereof whereby said area is exposed only through said two adjacent openings of the shutter.

7. In apparatus for photographing a televised image appearing on the screen of a cathode ray tube of a television receiver of the reflective optical type which is provided with a spherical reflector and a viewing screen, said reflector projecting the image to said viewing screen and having a central opening in axial alignment with the screen of said tube, the image also passing from the screen of said tube axially through said opening, the combination with said reflector of movable shutter means in optical relation to said opening for exposing a photographic plate to the televised image appearing on the screen of said tube and projected through said opening of the reflector, and means for synchronizing the movement of said plate exposing means with the frames of the image-field on said screen.

8. In apparatus for photographing a televised image appearing on the screen of a cathode ray tube of a television receiver of the reflective optical type which is provided with a spherical reflector having a central opening in axial alignment with the screen of said tube, the combination with said reflector of movable shutter means in optical relation to said opening for exposing a photographic plate to the televised image appearing on the screen of said tube and projected through said opening of the reflector, and means for synchronizing the movement of said plate exposing means with the frames of the image-field on said screen, said last mentioned means comprising means operable under the control of the vertical oscillator of the television receiver.

9. Apparatus for photographing a televised image appearing on the screen of a cathode ray tube of a television receiver which is provided with a vertical oscillator, said apparatus comprising movable photographic shutter means in optical relation to said screen for exposing a photographic plate to the televised image appearing on said screen and means for synchronizing the movement of said plate exposing means with the frames of the image-field on said screen, said last mentioned means comprising a thyratron operable under the control of the vertical oscillator of the television receiver.

10. Apparatus for photographing a televised image appearing on the screen of a cathode ray tube of a television receiver which is provided with a vertical oscillator, said apparatus comprising movable photographic shutter means in optical relation to said opening for exposing a photographic plate to the televised image appearing on the screen of said tube, and means for synchronizing the movement of said plate exposing means with the frames of the image-field on said screen, said last mentioned means comprising a thyratron having its grid connected to the output of the vertical oscillator of the television receiver and means for decreasing the cathode-bias resistance of said thyratron.

11. Apparatus for photographing a televised image appearing on the screen of a cathode ray tube of a television receiver which is provided with a vertical oscillator, comprising a movable photographic shutter, and image-reflecting means associated with said shutter and disposed in image-receiving relation to said tube and in position to reflect said image through the shutter opening to a photographic plate, when the shutter is open, means for operating said shutter, and means operable under the control of the vertical oscillator of the television receiver for controlling the actuation of said shutter-operating means, said last mentioned means comprising a thyratron having its grid connected to the output of the vertical oscillator of the television receiver and means for decreasing the cathode-bias resistance of said thyratron.

12. Apparatus for photographing a single-frame interlaced televised image appearing on the screen of a cathode ray tube, comprising a movable shutter, said shutter having a series of spaced openings and closed portions between pairs of adjacent openings, respectively, of said series, and means for moving said shutter in timed relation to the image forming lines of said frame on said screen for exposing the same area of a photograph plate through one of said single-frame televised image and thereafter through another of said openings to the scanning lines of the second field of said single-frame televised image with interuption, by said closed portion of the shutter while the shutter continues to move, of the exposure of said area between the exposures thereof to said two fields, said shutter moving means comprising a shaft and a synchronous motor releasably connected to said shaft, and means for interrupting the movement of said shutter as soon as another of said series of openings is positioned for the next exposure, said last mentioned means comprising means for disconnecting said motor from said shaft.

13. Apparatus for photographing a single-frame interlaced televised image appearing on the screen of a cathode ray tube, comprising a movable shutter, said shutter having a series of spaced openings and closed portions between pairs of adjacent openings, respectively, of said series, and means for moving said shutter in timed relation to the image forming lines of said frame on said screen for exposing the same area of a photograph plate through one of said openings first to the scanning lines of the first field of said single-frame televised image and thereafter through another of said openings to the scanning lines of the second field of said single-frame televised image with interruption, by said closed portion of the shutter while the shutter continues to move, of the exposure of said area between the exposures thereof to said two fields, and means for interrupting the movement of said shutter as soon as another of said series of openings is positioned for the next exposure, said shutter comprising a drum provided with said openings spaced circumferentially of the drum and with another opening at one end of the drum, image-reflecting means positioned within said drum and disposed in image-receiving relation to said tube through said end opening in position to reflect said image through the shutter openings, said shutter moving and interrupting means comprising a synchronous motor, means operatively connecting said motor releasably to said drum for turning the latter, means including a solenoid for effecting said operative connection of said motor to said drum, means for controlling the energization of said solenoid, and means for releasing said drum from its operative connection with said motor when said solenoid is de-energized.

14. Apparatus for exposing a surface to a single-frame interlaced televised image on the screen of a television receiver tube, said apparatus comprising a shutter, and means for actuating said shutter in synchronism with the image-scanning lines on said screen, the exposure of said surfaces by said shutter being progressively in unison with the horizontal image-forming lines on said screen, said shutter comprising a rotary drum having a series of circumferentially spaced openings and closed portions between pairs of adjacent openings, respectively, of said series, and means for moving said shutter in timed relation to the image forming lines of said frame on said screen for exposing the same area of a photograph plate through one of said openings first to the scanning lines of the first field of said single-frame televised image and thereafter through another of said openings to the scanning lines of the second field of said single-frame televised image with interruption, by said closed portion of the shutter while the shutter continues to move, of the exposure of said area between the exposures thereof to said two fields, the closed portion between another pair of said openings obstructing the exposure of said surface to the horizontal image-scanning lines of a preceding frame.

15. Apparatus for exposing a surface to a televised image composed of a frame formed of two interlaced fields on the screen of a television receiver tube, said apparatus comprising a movable shutter having an opening through which a predetermined area of said surface is progressively exposed in synchronism with the scanning lines of the first one of said fields and a separate opening through which the same area is thereafter progressively exposed in synchronism with the interlaced lines of the second one of said fields, and means for moving said shutter in said synchronized relation to said image-scanning lines on the screen of said tube.

16. In apparatus for photographing a televised image while the latter appears on the viewing screen of a television receiver, the combination with said receiver of a camera at the receiving station for taking a photograph of the televised image received at the receiving station, said camera being disposed in image-receiving relation to said receiver and free of optical relation with the viewing surface of said screen, and means for synchronizing the operation of the shutter of said camera with the appearance of the image on said screen so that the image photographed pursuant to the operation of said camera corresponds to the image which is being viewed on said screen.

17. The combination with a television receiver having a cathode ray tube provided with a screen on which an interlaced television image appears, of means for taking a single-frame photograph of the televised image, said means comprising a shutter having a series of spaced openings and closed portions between pairs of adjacent openings, respectively, of said series, and means for moving said shutter in timed relation to the image forming lines of said frame on said screen for exposing the same area of a photograph plate through one of said openings first to the scanning lines of the first field of said single-frame televised image and thereafter through another of said openings to the scanning lines of the second field of said single-frame televised image with interruption, by said closed portion of the shutter while the shutter continues to move, of the exposure of said area between the exposures thereof to said two fields, and means for interrupting the movement of said shutter as soon as another of said series of openings is positioned for the next exposure.

18. In apparatus for photographing a televised image, the combination with a television receiver which is provided with a vertical oscillator of a camera at the receiving station, mechanism for actuating the shutter of said camera to take the photograph of a televised image, and means for synchronizing the actuation of said shutter actuating mechanism with the formation of the received image comprising electrically operated means for controlling the operation of said mechanism, a thyratron for controlling the flow of current to said electrically operated means, means for supplying a pulse from the vertical oscillator of the television receiver to said thyratron for decreasing its negative grid bias, and separate controllable means for decreasing said negative grid bias, the additive decrease of said negative grid bias by said pulse and by said separate means being required to fire said thyratron for the flow of current to said electrically operated means, and means operable under the control of said electrically operated means to render said thyratron non-conducting.

19. In apparatus for photographing a televised image, the combination with a television receiver which is provided with a vertical oscillator of a camera at the receiving station, mechanism for actuating the shutter of said camera to take the photograph of a televised image, and means for synchronizing the actuation of said shutter actuating mechanism with the formation of the received image comprising electrically operated means for controlling the operation of said mechanism, a thyratron for controlling the flow of current to said electrically operated means, means for supplying a pulse from the vertical oscillator of the television receiver to said thyratron for decreasing its negative grid bias, and separate controllable means for decreasing said negative grid bias, the additive decrease of said negative grid bias by said pulse and by said separate means being required to fire said thyratron for the flow of current to said electrically operated means, and means operable under the control of said electrically-operated means to render said thyratron non-conducting, said separate controllable means being accessible for operation externally of the television receiver so that an observer of the televised images of the receiver may control the operation of said shutter mechanism for photographing a single-frame televised image.

20. In apparatus for photographing images appearing on the screen of a cathode ray tube, a shutter comprising a cylindrical drum having an imperforate circular wall at one end thereof and a plurality of equally dimensioned arcuate vanes extending outwardly from the periphery of said wall and longitudinally of said drum, said vanes being equally spaced from each other.

21. In apparatus for photographing images appearing on the screen of a cathode ray tube, a shutter control system comprising a rotary shutter, a first rotary shaft section carrying said shutter, a second rotary shaft section, spring means connecting said sections for releasably holding said second section in a retracted position, one of said shaft sections being provided with a recessed portion and the other of said shaft sections having a non-circular part slidably engageable in said recessed portion, a driven clutch member connected to said second section, a driving clutch member, means for rotating said driving clutch member, solenoid means disposed about said second section adjacent a magnetic portion thereof, and means to energize said solenoid means whereby said second section urges said driven member into engagement with said driving member.

22. In apparatus for photographing images appearing on the screen of a cathode ray tube, a shutter control system comprising a rotary shutter, a first rotary shaft section carrying said shutter, a second rotary shaft section, spring means connecting said sections for releasably holding said section in a retracted position, one of said shaft sections being provided with a recessed portion and the other of said shaft sections having a non-circular part slidably engageable in said recessed portion, a driven clutch member connected to said second section, a driving clutch member, means for rotating said driving clutch member, solenoid means disposed about said second section adjacent a magnetic portion thereof, means to energize said solenoid means, said energizing means comprising an arc discharge device connected to said solenoid means, and a source of pulse energy connected to said discharge device whereby upon the energization of said discharge device by said pulse energy, said solenoid means causes said second shaft to urge said driven member into engagement with said driving member.

23. In apparatus for photographing images appearing on the screen of a cathode ray tube, a shutter control system comprising a rotary shutter, a first rotary shaft section carrying said shutter, a second rotary shaft section, spring means connecting said sections for releasably holding said section in a retracted position, one of said shaft sections being provided with a recessed portion and the other of said shaft sections having a non-circular part slidably engageable in said recessed portion, a driven clutch member connected to said second section, a driving clutch member, means for rotating said driving clutch member, solenoid means disposed about said second section adjacent a magnetic portion thereof, means to energize said solenoid means, said energizing means comprising a negatively biased arc discharge device connected to said solenoid, a source of pulse energy connected to said discharge device, and means to reduce the negative bias of said discharge device, said discharge device becoming operative upon the coincidence of a pulse from said source and a reduction in said negative bias whereby said solenoid means causes said second shaft to urge said driven member into engagement with said driving member.

GILBERT T. SCHMIDLING.

REFERENCES CITED

The following references are of record in the file of this patent:

UNITED STATES PATENTS

| Number | Name | Date |
|---|---|---|
| Re. 18,537 | Karolus | July 19, 1932 |
| 1,591,612 | Dickinson | July 6, 1926 |
| 1,672,845 | Capstaff | June 5, 1928 |
| 1,955,300 | Kurnick | Apr. 17, 1934 |
| 2,166,440 | Jones | July 18, 1939 |
| 2,186,268 | Pakala | Jan. 9, 1940 |
| 2,214,299 | Heller | Sept. 10, 1940 |
| 2,219,120 | Somers | Oct. 22, 1940 |
| 2,227,135 | Hollmann | Dec. 31, 1940 |
| 2,251,332 | Gray | Aug. 5, 1941 |
| 2,251,786 | Epstein | Aug. 5, 1941 |
| 2,292,825 | Dilks | Aug. 11, 1942 |
| 2,294,015 | Salb et al. | Aug. 25, 1942 |
| 2,295,779 | Epstein | Sept. 15, 1942 |
| 2,309,506 | Herbst | Jan. 26, 1943 |
| 2,329,624 | Kellogg | Sept. 14, 1943 |
| 2,329,919 | Loughridge | Sept. 21, 1943 |
| 2,353,797 | Tondreau | July 18, 1944 |
| 2,378,746 | Beers | June 19, 1945 |
| 2,404,839 | Hammond et al. | July 30, 1946 |
| 2,420,029 | Brady | May 6, 1947 |
| 2,423,770 | Goldsmith | July 8, 1947 |
| 2,474,297 | Young | June 28, 1949 |

FOREIGN PATENTS

| Number | Country | Date |
|---|---|---|
| 687,728 | Germany | Feb. 5, 1940 |